(12) United States Patent
Acharya et al.

(10) Patent No.: US 9,024,485 B2
(45) Date of Patent: May 5, 2015

(54) DEVICE TO VERIFY SEQUENCE OF EVENTS DATA COLLECTION IN A CONTROL SYSTEM

(75) Inventors: Parag Vishwanath Acharya, Hyderabad (IN); Prabahar Harikrishnan, Bangalore (IN)

(73) Assignee: General Electric Company, Schenectady, NY (US)

(*) Notice: Subject to any disclaimer, the term of this patent is extended or adjusted under 35 U.S.C. 154(b) by 674 days.

(21) Appl. No.: 13/343,164

(22) Filed: Jan. 4, 2012

(65) Prior Publication Data

US 2013/0173217 A1    Jul. 4, 2013

(51) Int. Cl.
*H01H 33/59* (2006.01)
*H01H 47/00* (2006.01)
*G06F 15/00* (2006.01)
*G05B 23/02* (2006.01)

(52) U.S. Cl.
CPC ............ *G06F 15/00* (2013.01); *G05B 23/0264* (2013.01)

(58) Field of Classification Search
CPC ................................. H01H 33/59; H01H 47/00
USPC .......................................................... 307/113
See application file for complete search history.

(56) References Cited

U.S. PATENT DOCUMENTS

| 6,760,687 | B2 | 7/2004 | Apel et al. |
| 8,134,820 | B1 * | 3/2012 | Riccio et al. ................ 361/195 |
| 2008/0288120 | A1 | 11/2008 | Lindenmuth et al. |

* cited by examiner

*Primary Examiner* — Hal Kaplan
(74) *Attorney, Agent, or Firm* — Hiscock & Barclay LLP

(57) ABSTRACT

The present disclosure describes embodiments of a control system and a switch simulation device for use in the control system. The switch simulation device provides diagnostic capabilities that verify the accuracy and operability of sequence of events (SOE) data and SOE detection functions of the process control system. In one embodiment, the switch simulation device includes a pair of switches (e.g., metal-oxide field effect transistors (MOSFETS)) that are anti-parallel to one another. A drive circuit operates the switches at a pre-determined frequency to generate an output signal that simulates the position of switches that are coupled to components on the asset. The output signal impresses on contact inputs, which are coupled to the switches, and which are useful to generate the SOE data.

15 Claims, 3 Drawing Sheets

US 9,024,485 B2

DEVICE TO VERIFY SEQUENCE OF EVENTS DATA COLLECTION IN A CONTROL SYSTEM

BACKGROUND OF THE INVENTION

The subject matter disclosed herein relates to control systems, e.g., for industrial turbines and, in one embodiment, to devices configured to verify proper logging of sequence of events (SOE) data in the control system.

Equipment such as industrial and power generation turbines connect to control systems that monitor and control their operation. Exemplary control systems typically include hardware to implement application code (e.g., software, firmware, etc.) to operate the turbines. Operation often includes opening and closing switches and valves, activating and running motors, as well as other tasks permitting the equipment to perform its designated tasks.

In many cases, the control systems also monitor signals, e.g., signals that indicate the position and/or status of certain switches (e.g., safety switches). Changes in these signals may indicate "events" often associated with problems, issues, and malfunctions in the equipment and its operation. For proper detection and diagnosis, the control system registers these events along with the time at which the event occurs, thus providing a thorough database or "log" of information about the equipment and its operation. In one example, monitoring done in this manner results in chronologically arranged data or, what is also known as, a sequence of events (SOE) database. To ascertain the ultimate source of a failure, an end user (e.g., a maintenance or control operator) can review the log to debug the equipment and/or control system after failure or other significant change in the operation of the equipment takes place.

Problems with the log can arise from time to time if, for example, the control system does not property or accurately correlate, or time-stamp, the events with the actual time the event occurs. The margin for error for time-stamping is very often small. The difference between accurate and inaccurate times-stamps may be only a few milliseconds (ms) based on the type of equipment, configuration of the control structure, and the complexity of operation that the equipment/control structure performs.

The discussion above is merely provided for general background information and is not intended to be used as an aid in determining the scope of the claimed subject matter.

BRIEF DESCRIPTION OF THE INVENTION

As set forth below, a control system and switch simulation device are disclosed, wherein the switch simulation device generates a signal to verify data collection that relates to sequence of events (SOE) data. An advantage that may be realized in the practice of some disclosed embodiments of the control system and switch simulation device is to detect whether SOE data is properly time-stamped or identified relative to the time at which an event that is to be recorded occurs.

In one embodiment, the disclosure describes a device to verify operation of a sequence of events process in a control system. The device comprises an input to receive an input signal and a first switch and a second switch coupled to the input to receive the input signal. The device also comprises a drive circuit coupled to the first switch and the second switch. The drive circuit operates the switches at a pre-determined frequency to convert the input signal to an output signal. The devices further comprises an output coupled to the control system and through which the output signal conducts to the control system, wherein the first switch and the second switch are anti-parallel to one another.

In another embodiment, the disclosure describes a control system for controlling an asset. The control system comprises an input/output card with a plurality of contact inputs and a switch simulation device coupled to the input/output card. The switch simulation device comprises a first switch, a second switch anti-parallel to the first switch, and a drive circuit coupled to the first switch and the second switch. The drive circuit operates the switches at a pre-determined frequency to convert an input signal to an output signal that simulates an event signal at the plurality of contact inputs.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of invention. In the drawings, like numerals are used to indicate like parts throughout the various views. Thus, for further understanding of the invention, reference can be made to the following detailed description, read in connection with the drawings in which.

DETAILED DESCRIPTION OF THE INVENTION

Figure 1:
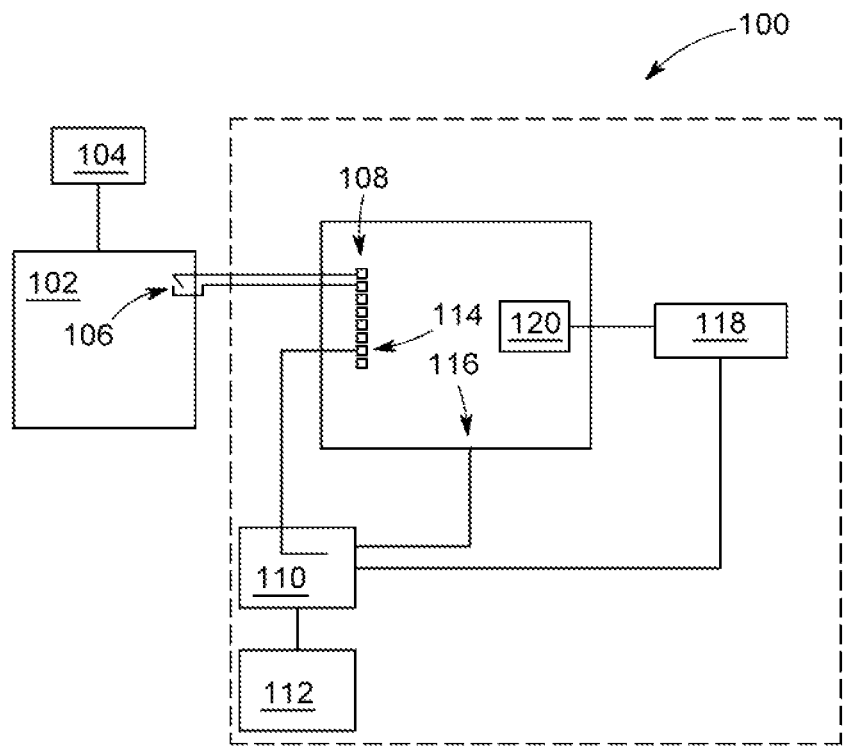
FIG. 1 is a schematic diagram of an exemplary control system.

FIG. 1 depicts an exemplary embodiment of a control system 100 with a control device 102 that monitors operation of an asset 104, e.g., a steam or gas turbine. The control device 102 includes one or more contacts 106 (or "switches 106"). The status of the switches 106 is communicated to contact inputs 108. The switches 106 may connect to components (e.g., valves, switches, etc.) on the asset 104. One or more of other inputs may also connect to sensors (e.g., temperatures sensors, accelerometers, etc.) to gather data that relates to conditions on or around the asset 104.

The control system 100 also includes a relay switch 110 and a switch simulation device 112, which can generate a switch simulation signal (e.g., a voltage signal) to simulate the positions (e.g., open and/or closed) of the switches 106. Examples of the relay switch 110 include double-throw and single-throw manual switches. These types of switches may require manual manipulation of the switch to open and close a circuit. On the other hand, integrated circuits and other circuit elements may embody the relay switch 110 to alleviate the need for manual intervention. The relay switch 110 couples with the contact inputs 108 and, in the present example, couples to one of the contact inputs 108 that is not connected to one of the switches 106. In this configuration the switch simulation signal only impresses on the open contact input, generally identified by the numeral 114. However, in other examples, the relay switch 110 couples to a contact input power 116 (also "contact input wetting power 116"). This configuration permits the switch simulation signal to impress on all of the contact inputs 108 to verify operation of all of contact inputs 108.

During operation of the control device 102 and the asset 104, the control system 100 will transmit an event signal to the switches 106 via the contact inputs 108. The position of the switches 106 determines whether the contact inputs 108 receive the event signal back from the switches 106. For example, when the switches 106 are closed, the event signal can conduct across the switches 106 and return to the contact inputs 108. On the other hand, when the switches 106 are open, the event signal is unable to conduct across the switches 106 and back to the contact inputs 108.

The control system 100 recognizes the return of the event signal at the contact inputs 108 and uses the presence and/or absence of the event signal to gather data about the operation of the asset 104. In one example, the control system 100 generates a sequence of events (SOE) log or table, which identifies the position of the switches 106 at any given time. Each of the events in the SOE log registers the position (e.g., open or closed) of the switches 106 based on, respectively, the presence of the event signal and the absence of the event signal at the contact inputs 108. The control system 100 can also apply a time-stamp to each event to indicate the time at which the event was registered. By continuously and/or periodically monitoring the events of the switches 106, the control system 100 can build the SOE log with information an end user (e.g., a technician) can use to diagnose problems that occur during operation of the asset 104.

The relay switch 110 and the switch simulation device 112 permit the control system 100 to verify the accuracy of the SOE log. For purposes of the present example, actuation of the relay switch 110 couples the switch stimulation device 112 to the unused contact input 114. In this configuration, the switch stimulation device 112 impresses the switch simulation signal onto the unused contact input 108. The switch simulation signal can have a waveform that simulates the positions of the switches 106. In one embodiment, the control system 100 recognizes the switch simulation signal as the event signal and, in response, enters events into the SOE log that correspond to the waveform as would normally occur in response to the event signal. Review of the resulting SOE log can verify that the control system 100 logs the SOE data properly, e.g., the time-stamp is accurate and reflects the characteristics and/or properties of the waveform.

Examples of the switch simulation device 112 can control the waveform to simulate events at pre-determined timing intervals. In one embodiment, the waveform has a frequency of 1000 Hz or less. The high frequency of the waveform is useful to simulate a very large number of events in a very short time and to verify accurate logging of sequence of events (SOE) data.

Referring back to FIG. 1, the control system 100 can include a control processing circuitry 118. Examples of the control processing circuitry 118 can execute control logic comprising programs (e.g., software and firmware) and operations to control the asset 104. Such logic may cause the control system 100 to generate the events signals that, for example, cause actuators on the asset 104 to adjust valves. In addition to the contact inputs 108, the control system 100 may have one or more microprocessors 120 configured to receive binary data indicating one of two states (e.g., on/off, open/closed, yes/no, high/low). In one example, the control device 102 detects the switch simulation signal and stores an indication of the position (e.g., open and/or closed) that the waveform represents in a memory, buffer, or other repository. Storage can also occur on one or more remote devices (e.g., an external server).

The control system 100 may include a free running counter or clock. Exemplary counters may, for example, be the counters provided with computer processors (e.g., CPUs) as well as other discrete devices associated with SOE data collection, processors, detection cards, and the like. Whenever the control system 100 detects the switch simulation signal at one of the contact inputs 108, the microprocessor 120 stores the corresponding indication as the SOE data in the requisite repository. This indication may include an event identification, such as an identification of the contact input, a value associated with the event (e.g., that the channel changed from high to low, or vice versa), and a value of the counter when the event was detected.

In one embodiment, the switch simulation device 112 operates continuously. However, self-diagnostics occurs only when the relay switch 110 couples the switch simulation device 112 and the switch simulation signal impresses onto the contact inputs 108. Self-diagnostics can occur at a pre-determined interval. In one example, the control system 100 activates the relay switch 110 every 100 seconds to couple the switch simulation device 112 to the contact inputs 108 (and/or the contact input power 116) for 20 to 30 ms. During that pre-determined interval, the switch stimulation signal stimulates the requisite contact input 108.

Figure 2:
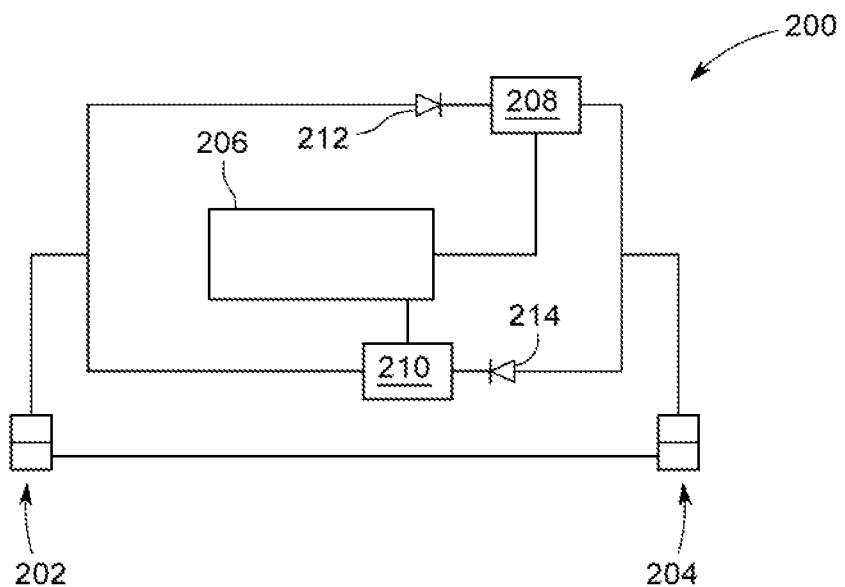
FIG. 2 is a schematic diagram of an exemplary switch simulation device for use in the control system of FIG. 1.

FIG. 2 illustrates a schematic diagram of an example of a switch simulation device 200 (e.g., switch simulation device 112 of FIG. 1). The switch simulation device 200 has an input 202 that receives an input signal and an output 204 through which the switching device 200 provides the switch simulation signal. In the present example, the switch simulation device 200 also includes a drive circuit 206 to regulate the waveform of the switch simulation signal independently of parameters of the input signal. The switch simulation device also includes a plurality of switch elements (e.g., a first switch element 208 and a second switch element 210) and a plurality of diode elements (e.g., a first diode element 212 and a second diode element 214). Examples of the switch elements include field effect transistors (e.g., FET, MOSFET, etc.), bipolar junction transistors (BJT), and insulated gate bipolar transistors (IGBT).

The diode elements place the switch elements in anti-parallel. This configuration permits use of the switch simulation device 200 with input signals consistent with both direct current (DC) and alternating current (AC) inputs. For AC input voltage, the first switch element 208 conducts the input signal for positive half cycles and the second switch elements 210 conducts the input for negative half cycles. When the input signal is DC input voltage, the first switch element 208 conducts the input signal but the second diode element 214 prevents the second switch elements 210 from conducting the input signal.

Figure 3:
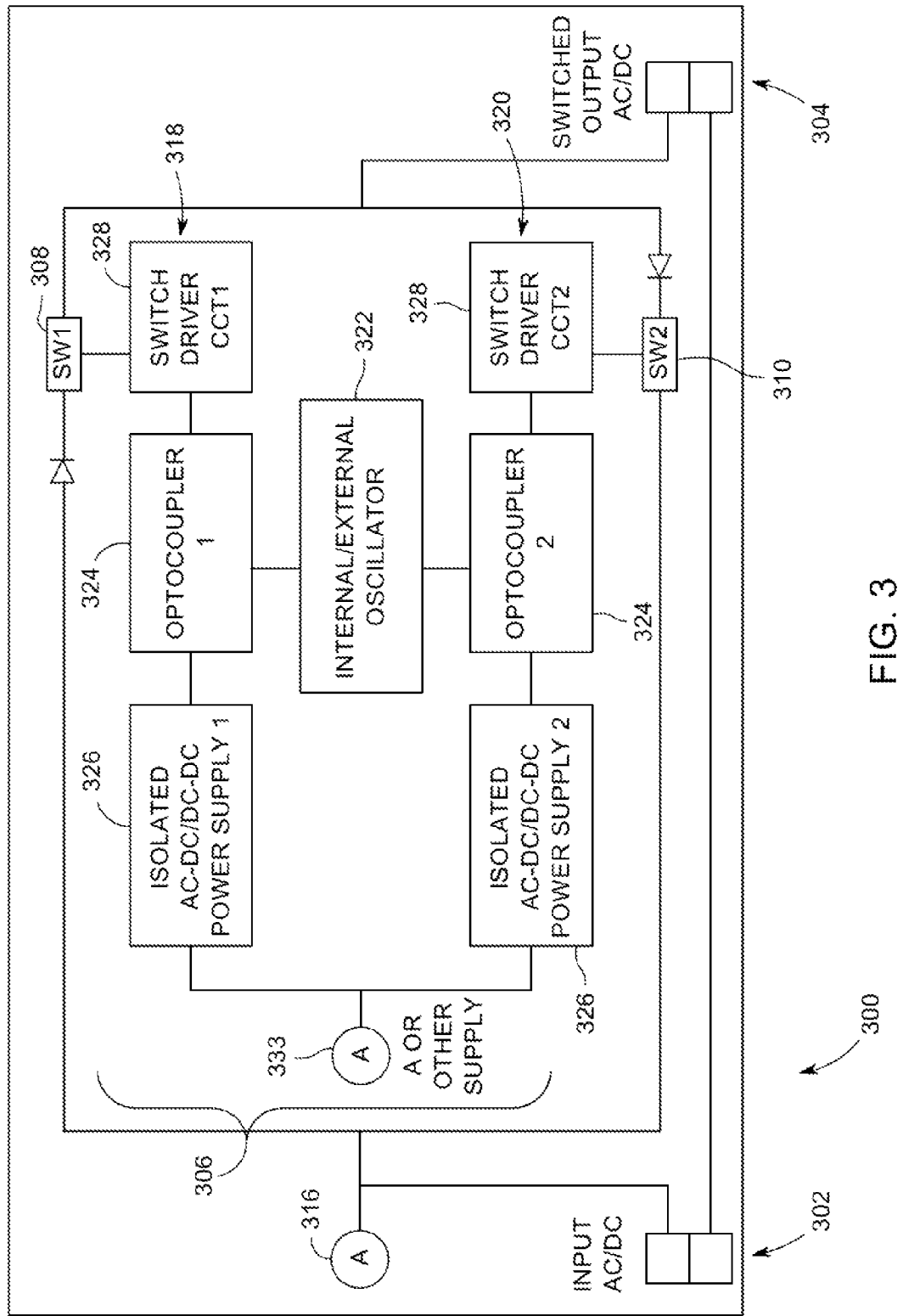
FIG. 3 is a schematic diagram of another exemplary switch simulation device for use in the control system of FIG. 1.

FIG. 2 depicts a schematic diagram of another example of a switch simulation device 300 in which details of the drive circuit 306 are shown. The switch simulation device 300 draws power via a first power input 316, which can couple the switch simulation device 300 to power from the contact inputs or from other components internal or external to the control device 300. In an example, the first power input 316 can be coupled to an input AC/DC 302. Although not shown in FIG. 3, power can also arise from a separate power supply in lieu of, or supplemental to, power at the power input 316.

In this example, the drive circuit 306 has a pair of switch paths (e.g., a first switch path 318 and a second switch path 320) and an oscillator 322. The switch paths couple with, respectively, the first switch element 308 and the second switch element 310. The switch paths include an opto-coupler 324 and a coupler power supply 326 that provides a power signal to the opto-coupler 324. A switch driver 328 couples to the respective switch element (e.g., the first switch element 308 and the switch element 310). The switch driver 328 can comprise elements (e.g., gate resistors, Zener diodes, etc.) that facilitate operation of the switching elements in response to the output from the opto-coupler 324. The drive circuit 306 also has a second power input 333 to provide power to the switch paths. The second power input 333 can draw power from the first power input 316 or from a separate supply.

The oscillator 322 can comprise an electronic circuit or collection of electrical elements that produce a pulse input. The pulse input can have a variety of waveforms, e.g., a sine wave or square wave, based on construction and implementation of the oscillator 322. In one embodiment, the oscillator 322 resides external to the drive circuit 306 and, in one example, the oscillator 322 is a separate component that couples with the drive circuit 306 to provide the pulse input to the opto-coupler 324 as suggested herein.

During operation of the switching device 300, the opto-coupler 324 receives the pulse input and the power signal. When the amplitude of the pulse input reaches a sufficient level, the opto-coupler 324 conducts the power signal from its primary side to its secondary side, which is coupled to the switch driver 328. The switch driver 328 operates the first switch element 308 and the second switch element 310. Opening and closing of one or more of the first switch elements 308 and the second switch elements 310 generates the output signal that the switching device 300 delivers to the channels. In one example, frequency and duty cycle of the output signal depend on the parameters of the pulse input at the primary side of the opto-coupler 324. The output signal can be output at the switched output AC/DC 304.

Figure 4:
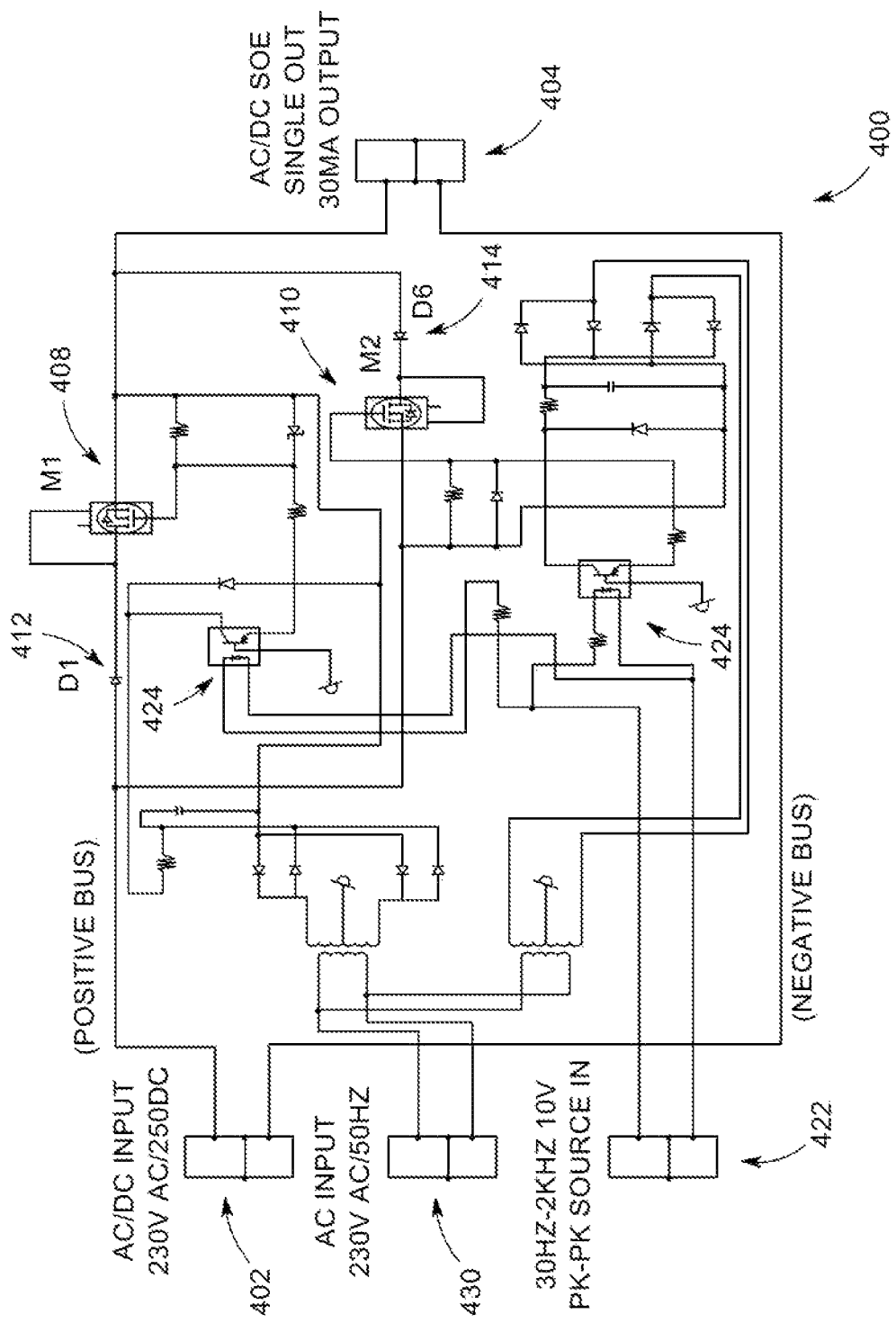
FIG. 4 is a schematic diagram of a topology for yet another exemplary switch simulation device for use in the control system of FIG. 1.

FIG. 4 depicts a schematic diagram of an exemplary topology for a switching device 400. This topology represents, in graphical format, an exemplary arrangement of components. These components include discrete elements (e.g., resistors, capacitors, inductors etc.) and/or other electrical elements (e.g., MOSFETs). Although these components are shown in certain configuration, the present disclosure contemplates other arrangements for these, as well as other, components to achieve similar results. Artisans skilled in the relevant electrical arts will recognize that the topology of FIG. 4 is not the only combinations of components that can facilitate the implementation of the subject matter disclosed herein.

The switching device 400 includes an input 402 and an output 404, both of which can terminate at a connector or other device to permit interface with other, external components (e.g., a power supply and/or the I/O card). The switching device 400 also includes a first switch 408 and a second switch 410. These switches are shown in combination with a first diode 412 and a second diode 414. The switching device 400 further includes an oscillator 422 that, in this example, is in the form of a connector to receive a corresponding connector from an external device. The switching device 400 still further includes a pair of opto-couplers 424 and a second power supply 430.

Although not shown, the topology of FIG. 4 may further include one or more processors and/or memory for use to store and execute executable instructions. These executable instructions may, in one example, interface, e.g., with the drive circuit, to operate the switches as disclosed herein. The components of FIG. 4 may occur on, or as part of, a printed circuit board or other laminated structure including flexible and resilient circuitry. In other examples, the topology may be incorporated into larger schematic diagrams, e.g., that define topology of the control devices and systems or similar packaging. On the other hand, the present disclosure contemplates construction of these devices onto and as part of an integrated circuit package using various packaging technologies (e.g., chip-on-chip, chip-on-board, and the like). In one example, processors comprise a central processing unit (CPU) such as an ASIC and/or an FPGA. Processor can also comprise state machine circuitry or other suitable components capable of receiving inputs from part of the switch devices, the control devices, and/or peripheral devices (e.g, computers). Memory comprises volatile and non-volatile memory and can be used for storage of software (or firmware) instructions and configuration settings. In some embodiments, processors, memory, and other elements and components are found in a single integrated circuit (IC) or other component. As another example, processors can include internal program memory such as RAM and/or ROM. Similarly, any one or more of functions of these components can be distributed across additional components (e.g., multiple processors or other components).

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A device to verify operation of a sequence of events process in a control system, said device comprising:
 an input to receive an input signal;
 a first switch and a second switch coupled to the input to receive the input signal;
 a drive circuit coupled to the first switch and the second switch, the drive circuit operating the switches at a predetermined frequency to convert the input signal to an output signal; and an output coupled to the control system and through which the output signal conducts to the control system, wherein the first switch and the second switch are anti-parallel to one another.

2. The device of claim 1, further comprising a first diode and a second diode coupled to, respectively, the first switch and the second switch.

3. The device of claim 1, wherein the input signal comprises an alternating current (AC) voltage.

4. The device of claim 1, wherein the input signal comprises a direct current (DC) voltage.

5. The device of claim 1, wherein the output signal has a frequency of 1000 Hz or less.

6. A control system for controlling an asset, said control system comprising:

an input/output card with a plurality of contact inputs;

a switch simulation device coupled to the input/output card, the switch simulation device comprising a first switch, a second switch anti-parallel to the first switch, and a drive circuit coupled to the first switch and the second switch, the drive circuit operating the switches at a pre-determined frequency to convert an input signal to an output signal that simulates an event signal at the plurality of contact inputs.

7. The control system of claim 6, further comprising a relay device coupled to the plurality of contact inputs and the switch simulation device, wherein closing the relay device connects the output signal to the plurality of contact inputs.

8. The control system of claim 7, wherein the relay device connects to one of the plurality of contact inputs.

9. The control system of claim 7, wherein the relay device connects to contact input wetting power on the input/output card.

10. The control system of claim 7, wherein the control system is configured to activate the relay device automatically.

11. The control system of claim 7, wherein the relay device comprises one of an electromechanical relay, a solid-state relay, or a manually actuated switch.

12. The control system of claim 6, further comprising a counter to timestamp changes in the output signal at the channels.

13. The control system of claim 6, wherein the drive circuit couples with an external oscillator that causes the pre-determined frequency.

14. The control system of claim 6, wherein the pre-determined frequency is 1000 Hz or less.

15. The control system of claim 14, wherein the input signal comprises a direct current (DC) voltage.

\* \* \* \* \*